United States Patent Office 3,265,652
Patented August 9, 1966

3,265,652
RESIN BINDERS
Peter T. Sarjeant, Williamsburg, Pa., and William E. Morris, Charleston, S.C., assignors to West Virginia Pulp and Paper Company, New York, N.Y., a corporation of Delaware
No Drawing. Filed Mar. 11, 1964, Ser. No. 351,194
4 Claims. (Cl. 260—25)

This invention relates to resin binders and to such binders prepared from a combination of a phenolic resole, urea and a natural thermoplastic resin derived from pinewood. As "Vinsol" is the most widely known of several natural pine wood resins on the market, for the purposes of brevity, it has been employed throughout this application to broadly denote such natural thermoplastic resin extracts of pine wood.

It is the object of this invention to provide a thermosetting resin which is generally comparable in physical characteristics, to phenolic resin binders but which can be produced at substantially lower cost.

We have found that by the extension of a phenolic resole with Vinsol and urea within certain relative proportions that from 50 to 75% of the phenolic resole may be replaced. As both urea and Vinsol are of lower cost than the phenolic resole considerable savings can be achieved while retaining the generally good physical characteristics of the phenolic resins.

Our basic formulation comprises 100 parts of phenolic resole from 70 to 200 parts of Vinsol and from 30 to 100 parts of urea. In this formulation, it is also essential that the amount of urea employed be equal to between 30 and 75% the Vinsol. All parts indicated in the above formulation and elsewhere in this specification are by weight on a solids basis.

It has been found that binders prepared according to this formulation are effective in many adhesive applications where phenolic resin varnishes are presently employed such as in the manufacture of flakeboard, plywood, and mineral fiber mats.

It has long been suggested that natural thermoplastic resins such as Vinsol be employed in the extension of phenolic resins and considerable quantities of Vinsol have been employed in such use. It has been found that while Vinsol is quite an effective extender when employed in relatively low amounts, i.e., less than 20% of the total binder, and actually enhances certain properties of the phenolic resins when employed in these low quantities, the strength and water resistance of the binder is greatly decreased when larger quantities of Vinsol are employed. For this reason alone, it is quite surprising that the above formulation is effective where the Vinsol is present in an amount equal to between 32 and 50% of the total binder solids. It is even more surprising, however, when it is considered that no two of the components used in this formulation can be employed together without the third component to produce a binder having the strength and moisture resistance of the phenolic resins. For example, addition of urea to the phenolic resole in the quantities used in the formulation not only decreases the strength of the cured binder but also produces an adhesive having little or no moisture resistance. The use of urea and Vinsol together will not even produce a thermosetting binder. But used in combination with each other in accordance with our formulation, these individual components will react with each other in such a manner that a thermosetting resin is obtained having very good strength and moisture resistance properties.

Vinsol is a dark colored, hard, brittle, high-melting thermoplastic resin material. It is an extract of pine wood, particularly the aged stumps of southern pine and is, like most natural resins, a complex mixture of various chemical components. Its constituents include acidic phenolic materials in the form of high molecular weight phenols, carboxyl-substituted phenols, substituted phenyl ethers, and poly phenols; high molecular weight neutral compounds derived from resinous and polymeric terpenes; and acidic materials derived from rosin acids and oxidized rosin acids. A typical analysis of Vinsol shows that about 60% is acidic phenolic materials, 25% acidic materials derived from rosin, 10% neutral resinous and polymerized materials, with the remaining 5% primarily waxes.

Vinsol is essentially insoluble in aliphatic hydrocarbons and soluble in aromatic hydrocarbons. It is saponifiable and esterifiable with polyhydric alcohols, and typically has an acid number of 90–105. Typical analyses for it are: saponification number 165; methoxyl content, 5.3%; softening point 110 to 125° C. Further details on the properties and nature of Vinsol are conatined in the trade publication "Vinsol Resin, Properties and Uses" published by Hercules Powder Company, copyright 1958.

Other natural thermoplastic resin extracts of pinewood are of similar composition and possess similar properties. Among the other products usable in this invention are "Solo" and "Corex."

The phenolic resins usable in this invention are the A-stage resoles prepared by reacting an aldehyde with a phenol under the influence of an alkaline catalyst. These resoles consist primarily of monomeric and dimeric substituted phenols which still retain solubility in aqueous alkaline solutions and low molecular weight alcohols such as methanol, ethanol and isopropanol. Polymerization of these resole results in their conversion first to a fusable but insoluble B stage and finally to an insoluble, infusable, thermoset C stage. The resoles may be prepared from a wide variety of phenols, including, phenol, resorcinol, cresol, xylenol and various aliphatic substituted phenols, and a likewise wide variety of aldehydes such as acetaldehyde, benzaldehyde, furfural, and formaldehyde. The reaction of these components under alkaline catalysts may be conducted under a wide variety of conditions well known to the phenolic resin art. The only critical features for use in our formulation are that the resins are alkaline catalyzed and that they are soluble in aqueous alkaline solutions, i.e. by general definition they are resoles.

From our work, it appears that the resoles, for best results, should be prepared so as to have between about 1.3 to 2.0 hydroxyl substituted groups per mole of phenolic material. Within this range a good balance is achieved between the reactivity of resole, the Vinsol and urea in our formulation. In general, the larger the quantity of urea employed, the greater the hydroxyl substitution. This does not mean, however, that resoles having greater or lesser substitution cannot be employed, but that outside this range the properties tend to fall off. Very broadly hydroxyl substitution up to 3.0 and as low as 1.2 can be employed. Below the 1.2 level, insufficient reactivity of the resole results in almost complete deterioration of the properties of the binder.

The urea employed in our invention should not be confused with urea formaldehyde resins as these latter materials, which are formed by the reaction of urea with an aldehyde, if employed in our formulation in place of the urea, result in a resin having substantially different properties. The most notable result of the use of the urea formaldehyde resins is a very substantial decrease in the moisture resistance of the cured resin binder.

The binders of this invention may be simply and easily prepared by merely mixing the three ingredients in their proper ratios. The urea is readily soluble in the resole solution which commonly has a water or low molecular weight alcohol solvent base. The Vinsol, however, is not soluble in either a resole solution or a resole-urea solution. A highly alkaline, pH 10.7, alkali metal salt of Vinsol sold under the designation "Vinsol NVX", is soluble in these solutions and in water. Vinsol in either form, i.e. either as the salt or in the salt free form, may be employed although due to the high alkalinity of the salt and its effects on the pH of the binder formulation it is greatly preferred that the salt free or acid form of Vinsol be employed. While the salt free form does not dissolve, it can easily be dispersed in the resole solution or resole-urea solution by the use of alkaline stable, emulsifying agents such as soaps. For ease in preparing a smooth resin binder, it is preferred that the Vinsol be added to either the resole solution or to the resole-urea solution in the form of an aqueous emulsion. As the Vinsol in this form is already intimately dispersed prior to addition to the resole or resole-urea solution more uniform dispersion of the Vinsol in the binder is achieved than if it were added as a dry powder.

Although the Vinsol is not soluble in resole or urea-resole solutions, when heat is applied to the binder during curing, the solvent is volatilized and the Vinsol melted. Under these conditions, it appears that the Vinsol dissolves in the resole and urea to provide a state of intimate association where all the components may react.

The practice of this invention may be seen in the following example.

EXAMPLE 1

55 parts by weight of a phenol-formaldehyde resole solution having a solids content of 54% and a pH of 8.9 were diluted with 215 parts by weight of water. To this solution were added 28.0 parts by weight of urea and 105.0 parts by weight of a 40% solids aqueous Vinsol emulsion. This binder, having a solids content of 25% thus contained relative proportions of 100 parts resole solids, 93 parts urea, and 140 parts Vinsol all by weight. The pH of the binder was adjusted to 8.75 with a small quantity of sodium hydroxide. At this pH the binder was stable and could be stored at room temperature for extended periods of time without appreciable advancement. The hot plate cure time of the binder at 300° F. at this pH was almost 7 minutes. For many purposes this is excessive but could be reduced appreciably by slight increase in the pH. By increasing the pH to 9.30 the cure time was reduced to 3 minutes.

This illustrates an important factor in the manufacture and use of binders prepared using our formulation. In general, it is preferable to prepare the binder formulation at a pH between 3 and 9.0 so that they can be stored without advancement. Such binders, however, are somewhat slow curing so that immediately prior to use it is likewise preferable that the pH of the binder be raised to level above 9.0. It should be obvious, however, that where the binder is to be used shortly after preparation or where a slower curing resin can be employed these practices need not necessarily be employed.

The following results obtained from the testing of the tensile strength and moisture resistance of test specimens molded from glass beads bound with the binder prepared in this example is indicative of the excellent properties of our binder formulation. In this test 100 parts by weight of glass beads −70 +150 mesh were coated with 14.72 parts by weight of binder which contained 3.68 parts binder solids. The binder coated glass beads were molded into the shape of a flattened dog bone and the binder cured at 450° F. for 7 minutes. After cooling, the tensile of the molded specimen was determined in triplicate. Other specimens were subjected for two hours to an atmosphere of 100% relative humidity at 100° F. The tensile strengths of these specimens were then determined.

The same test was performed employing the unadulterated phenolic resin used in preparing our binder. The results of these tests are shown in the following table.

| Type Resin | (Tensile Strength), p.s.i. | |
| --- | --- | --- |
| | Dry | After 2 hrs. at 100° F., 100% humidity |
| Straight Resole | 390 | 140 |
| Binder of Ex. 1: 30% resole, 28% urea, 42% Vinsol | 555 | 230 |

Using the procedure above, a binder was produced containing 40% resole solids, 18% urea, and 42% Vinsol. When tested with the glass beads it yielded specimens having a dry tensile of 665 p.s.i. and a tensile after humid aging of 155 p.s.i.

65.6 parts by weight of a different phenol-formaldehyde resole having a solids content of 61% and a pH of 7.9 diluted with 151.2 parts by weight of water. To this solution were added in succession 8 parts of 50% sodium hydroxide, 18 parts of urea and 42.9 parts of Vinsol (98% solids). The solids of this binder was 35% and the pH 8.6. When tested with the glass beads as in Example 1, the binder produced specimens having a dry tensile of 550 p.s.i. and a tensile after humid aging of 280 p.s.i.

While our formulation has been illustrated in specific fashion in the above example, it is to be understood that our invention can be modified substantially while retaining the spirit of the invention. For example, as is well known in the binder art various additives may be added to our formulation, so as to modify the binder for specific purposes such as the addition of phosphates, or borates to impart fire resistance, the addition of glycols or other polyols to impart plasticity or the addition of wood flour or other thickening agents to increase viscosity and decrease penetration.

We claim:
1. A resin binder which comprises 100 parts by weight of a phenol-aldehyde resole and between 30 to 100 parts by weight of urea in mutual solution and between 70 and 200 parts by weight of an aliphatic hydrocarbon-insoluble, aromatic hydrocarbon-soluble resin extract from pine wood intimately dispersed in said solution, the quantity of said urea being from 30 to 75% of the weight of said resin extract.
2. The resin binder of claim 1 having a pH between 3 and 9.
3. A thermoset resin which comprises the reaction product obtained by the heat curing of the binder of claim 1.
4. The method which comprises adjusting the pH of the resin binder of claim 2 to a pH above 9.0 and heat curing the resin binder.

References Cited by the Examiner

UNITED STATES PATENTS

| 1,870,018 | 8/1932 | Moss | 161—269 |
| 2,694,013 | 11/1954 | Goss | 106—203 |
| 2,758,101 | 8/1956 | Shappell | 260—25 |

FOREIGN PATENTS

| 690,707 | 9/1930 | France. |
| 1,102,979 | 3/1961 | Germany. |
| 558,654 | 1/1944 | Great Britain. |

OTHER REFERENCES

Hercules Vinsol Resin, Bulletin of Hercules Powder Co., 1951, pgs. 11–16 relied on (16 pages total) copy available in Scientific Library.

LEON J. BERCOVITZ, *Primary Examiner.*

F. McKELVEY, *Assistant Examiner.*